United States Patent [19]

Ishibe et al.

[11] 4,071,375

[45] Jan. 31, 1978

[54] PROCESS FOR PREPARING STABLE AQUEOUS DISPERSIONS OF ROSIN-BASE MATERIAL

[75] Inventors: Shuhei Ishibe, Nara; Toshiharu Okumichi, Suita; Yasushi Ishihara, Osaka; Hisayoshi Naka, Sakai, all of Japan

[73] Assignee: Arakawa Rinsan Kagaku Kogyo Kabushiki Kaisha, Osaka, Japan

[21] Appl. No.: 732,209

[22] Filed: Oct. 14, 1976

[30] Foreign Application Priority Data

Oct. 21, 1975 Japan .............................. 50-127019

[51] Int. Cl.$^2$ .......................... C08J 3/02; C08L 93/00
[52] U.S. Cl. ...................................... 106/238; 162/180
[58] Field of Search ............... 162/168, 180; 260/106, 260/27, 29.6 M; 252/6.5; 106/131, 238

[56] References Cited

U.S. PATENT DOCUMENTS

3,565,755  2/1971  Davison .................................. 260/27

*Primary Examiner*—Lewis T. Jacobs
*Attorney, Agent, or Firm*—Bierman & Bierman

[57] ABSTRACT

A process for preparing a stable aqueous dispersion of rosin-base material by dissolving in a water-immiscible organic solvent a rosin-base material composed of 0 to 95 wt. % of rosin and 100 to 5 wt. % of an adduct of rosin and $\alpha,\beta$-unsaturated carboxylic acid or anhydride thereof, dispersing the organic solvent solution in water in the presence of a dispersant and removing the organic solvent from the resulting emulsion, the process being characterized in that the dispersant in an alkali metal salt of a half alkyl sulfate.

14 Claims, No Drawings

PROCESS FOR PREPARING STABLE AQUEOUS DISPERSIONS OF ROSIN-BASE MATERIAL

This invention relates to a process for preparing stable aqueous dispersions of rosin-base material, and more particularly to a process for preparing aqueous dispersions which consist essentially of a rosin-base material, a dispersant and water and which are useful for the sizing of paper.

Processes for preparing aqueous dispersions of rosin-base material are already known. The specification of U.S. Pat. No. 3,565,755, for example, states that aqueous dispersions useful as sizing agents for the manufacture of paper can be prepared by dissolving a rosin-base material in benzene or like water-immiscible organic solvent, admixing the solution with an amount of aqueous alkali solution to neutralize the rosin-base material to some extent, dispersing the resulting non-uniform mixture in water and distilling off the organic solvent from the emulsion. However, the aqueous dispersions obtained by this process have the serious drawback of being poor in stability, particularly in mechanical stability and dilution stability, i.e., the stability when diluted with water, particularly with hard water.

Japanese Patent Application Disclosure No. 36703/1975 and German Patent Application Disclosure No. 2,435,614 further propose a process wherein the rosin-base material is dispersed in water with use of a water-soluble cationic polymer such as water-soluble polyaminopolyamide-epichlorohydrin resin to obtain aqueous dispersions which are usable as sizing agents for paper. The proposed process requires the use of at least 10 wt. % of a water-soluble cationic polymer based on the rosin-base material. Moreover, the aqueous dispersions obtained have poor stability and give low sizing effects.

Japanese Patent Application Disclosure No. 43202/1975 and German Patent Application Disclosure No. 2,437,656 further disclose a process in which a rosin-base material and an aqueous solutions of alkali metal alkyl benzensulfonate are mixed together and melted by heating, and the molten mixture is dispersed in water to obtain an aqueous dispersion of rosin-base material. Although the aqueous dispersion has relatively good properties as a sizing agent for the manufacture of paper, the stability of the dispersion itself still remains to be improved.

Thus the aqueous dispersions obtained by the conventional processes have the fatal drawback of being poor in stability, particularly in mechanical stability and dilution stability.

Sizing agents are handled generally by pumps and therefore subjected to mechanical shear before being placed into use after they have been produced. Accordingly sizing agents must have mechanical stability. However, all the foregoing aqueous dispersions heretofore provided have inferior mechanical stability, such that when subjected to, for example, mechanical shear, the constituent particles become coarse forming agglomerates. The agglomerates will be deposited in the pumps and lines for conveying the dispersions, thus entailing the necessity of interrupting the operation for cleaning. Furthermore, even when the dispersions are handled carefully, the above-mentioned agglomerates will be unavoidably produced with the same disadvantages as above.

The water used for papermaking is usually river water, tap water, well water or like water which are frequently high in hardness, so that the sizing agent is required to have stability in hard water. In view of the cost of transport, the sizing agent is prepared generally in a high concentration and is added in a very small amount to an aqueous slurry of pulp for papermaking as diluted usually to a concentration of about 5 wt. % so as to be readily dispersible in the pulp slurry. When diluted, however, the aqueous dispersions of rosin-base material heretofore proposed have low stability particularly in hard water. Because of the low stability, the aqueous dispersions must be uniformly diluted within a short period of time immediately before use and added to the aqueous pulp slurry. This needs a special apparatus for dilution.

An object of this invention is to provide a novel process for preparing aqueous dispersions of rosin-base material which are very excellent in stability, particularly in mechanical stability and dilution stability.

Another object of this invention is to provide a process for preparing highly stable aqueous dispersions of rosin-base material with use of a small amount of dispersant.

Another object of this invention is to provide a process for preparing aqueous dispersions of rosin-base material having outstanding properties as sizing agents for the manufacture of paper.

Still another object of this invention is to provide aqueous dispersions of rosin-base material which are much superior particularly in mechanical stability and dilution stability to the aqueous dispersions heretofore provided, very advantageous for use in the sizing of paper and economically usable.

These objects of this invention can be achieved by a process for preparing stable aqueous dispersions of rosin-base material by dissolving in a water-immiscible organic solvent a rosin-base material composed of 0 to 95 wt. % of rosin and 5 to 100 wt. % of an addition reaction product of rosin and $\alpha,\beta$-unsaturated carboxylic acid or anhyride thereof, dispersing the organic solvent solution in water in the presence of a dispersant and removing the organic solvent from the resulting emulsion, the process being characterized in that the dispersant is an alkali metal salt of a half alkyl sulfate.

We have found that the use of the alkali metal salt of a half alkyl sulfate eliminates all the drawbacks of the conventional processes described above, making it possible to obtain aqueous dispersions of rosin-base material which are very outstanding particularly in mechanical stability and dilution stability, give excellent sizing effects and are accordingly very useful in the sizing of paper. This invention has been accomplished based on this finding.

Although various known rosin-base materials are useful in this invention, it is preferable to use rosin-base materials composed of 0 to 95 wt. % of rosin and 5 to 100 wt. % of an addition reaction product of rosin and $\alpha, \beta$-unsaturated carboxylic acid. (The addition reaction product will be hereinafter referred to as "rosin adduct.") Examples of useful rosins for constituting the rosin-base materials are gum rosin, wood rosin, tall oil rosin, and modified products and mixtures of these rosins. The modified products which are modified for inhibite the crystallization are those in which the conjugated double bonds of resin acid, the main component of rosin, have been modified while permitting the carboxyl groups thereof to remain thereof. Examples of such modified products are hydrogenated rosins, disproportionated resins, polymerized rosins, aldehyde-modified rosins, etc., among which aldehydemodified rosins are particularly preferable. Aldehyde-modified rosins can be prepared usually by reacting a rosin and 2 to 8 wt. %, based on the rosin, of formaldehyde or acetaldehyde at a temperature of about 140° to about 200° C for 0.5 to 3 hours in the presence of sulfuric acid, p-toluenesulfonic acid or like acid catalyst. The rosin adduct, the other component of the rosin-base materials, is referred to as a "fortified rosin" in the art and can be prepared by reacting a rosin (preferably aldehyde-modified rosin) nd an α,β-unsaturated carboxylic acid usually at a temperature of about 150° to about 250° C. Examples of useful α, β-unsaturated carboxylic acids are various. However, it is preferable to use acrylic acid, maleic acid, fumaric acid, itaconic acid, anhydrides of these acids and mixtures thereof, among which fumaric acid, maleic acid and maleic anhydride are most suitable. The rosin-base materials to be used in this invention contain preferably 2 to 30 wt. %, more preferably 3 to 15 wt. %, of the adducted α, β-unsaturated carboxylic acid based on the total weight of the rosin contained in the material. The rosin-base materials can be obtained directly by reacting a specified amount in the foregoing range of the α, β-unsaturated carboxylic acid with rosin, or by reacting an appropriate amount of the α, β-unsaturated carboxylic acid with rosin and admixing additional rosin with the resulting rosin adduct. The amount of the rosin so admixed is up to 95 wt. %. The ingredients are mixed together in such proportions that the resulting mixture contains preferably 2 to 30 wt. %, more preferably 3 to 15 wt. % of the adducted α, β-unsaturated carboxylic acid.

The aqueous dispersions of this invention are prepared by dissolving the rosin-base material in a water-immiscible organic solvent and dispersing the organic solvent solution in water with use of a specified dispersant. It is essential in the invention that the rosin-base material be dispersed in water in the form of organic solvent solution, while the use of the rosin-base material melted fails to give the desired result. Further it is critical that the dispersant be an alkali metal salt of a half alkyl sulfate. The use of other usual dispersants fails to give the desired result. The alkyl groups in useful alkali metal salts of half alkyl sulfates are not particularly limited; examples are straight-chain or branched-chain alkyls having 8 to 22 carbon atoms, such as octyl, nonyl, decyl, dodecyl, myristyl, cetyl, stearyl, eicosyl, etc. Among these examples, straight-chain or branched-chain alkyls having 10 to 16 carbon atoms are preferable. Particularly dodecyl and myristyl are most suitable. Further useful alkali metals are not particularly limited; for example, lithium, potassium, sodium, etc. are usable, among which sodium is preferable. Examples of the preferable salts are sodium salt of half dodecyl sulfate and sodium salt of half myristyl sulfate. The alkali metal salt of half alkyl sulfate (which may be hereinafter referred to briefly as "dispersant") is used in an amount preferably of 0.2 to 5 wt. %, more preferably 0.5 to 3.0 wt. %, based on the rosin-base material to be dispersed. If the amount of the dispersant greatly exceeds 5 wt. %, the aqueous dispersion obtained will have improved mechanical stability but tends to give reduced sizing effects.

According to this invention, the rosin-base material is dispersed with the dispersant in the following manner. The rosin-base material is first dissolved in a water-immiscible organic solvent to prepare a solution having a viscosity (at 25° C) preferably of up to 1000 cps, more preferably up to 500 cps. and a concentration preferably of about 20 to about 70 wt. %, more preferably about 40 to about 60 wt. %. Useful water-immiscible organic solvents are those heretofore known, among which preferable are, for example, benzene, toluene, cyclohexane, carbon tetrachloride, etc. which are azeotropic with water. In particular benzene is most suitable. Subsequently water and the dispersant, or an aqueous solution of the dispersant is added to the organic solvent solution to pre-disperse the rosin-base material. The material is then fully dispersed at a temperature preferably of about 10° to about 80° C, more preferably about 30° to about 60° C. The water thus used and serving as a constituent of the aqueous dispersion of this invention need not be purified water but is preferably soft water. The amount of the water to be used is so adjusted that the mixture of the rosin-base material, organic solvent and water will contain 10 to 40 wt. % of the rosin-base material. For the pre-dispersion, it is preferable to resort to a vigorous stirring procedure or to use a homomixer. The dispersion following the pre-dispersion is carried out with use of a homogenizer of the piston or ultrasonic type. It is particularly preferable to use a piston-type homogenizer in which the clearance through which the pre-dispersed emulsion is charged in by a piston is compressed on its opposite sides to disperse the emulsion under pressure. The pressure acting on the clearance is the output pressure of the emulsion. The pressure is usually 100 to 600 kg/cm$^2$, preferably 200 to 400 kg/cm$^2$. Examples of such high-pressure homogenizers of the piston type commercially available are "Model 15M-8TA" and "Model 31M-3TA," products of Gaulin Corporation, U.S.A.

Subsequently the organic solvent contained in the resulting emulsion is then removed preferably at about 30° to about 90° C at reduced pressure, whereby the desired aqueous dispersion is obtained. Since part of the water is usually distilled off along with the organic solvent, the aqueous dispersion obtained has a slightly increased concentration.

The aqueous dispersions of this invention thus prepared contain usually 1 to 60 wt. %, preferably 30 to 45 wt. %, of rosin-base material and usually 0.2 to 5 wt. %, preferably 0.5 to 3.0 wt. %, of an alkali metal salt of a half alkyl sulfate based on the rosin-base material. The dispersions contain the rosin-base material as dispersed therein in the form of particles about 0.03 to about 4μ, preferably 0.03 to 1μ, in size. The aqueous dispersions have a white to milky white appearance and a pH of 3 to 5. The dispersions remain stable at room temperature for at least six months free of precipitation and have high mechanical stability and high dilution stability as will be apparent from the examples given later.

The aqueous dispersions of this invention can be used as sizing agents for the manufacture of paper by various known methods. For example, the aqueous dispersion of this invention is added, along with alum or like fixing agent, to an aqueous slurry of pulp, and the slurry is made into sheets at a pH of 4 to 6. Alternatively the aqueous dispersion of this invention is added to an aqueous slurry of pulp along with a small amount of alum or like fixing agent and a very small amount of a cationic auxiliary fixing agent, and the slurry is made into sheets at a pH of 5 to 7 as disclosed in Japanese Patent Publication No. 30201/1974 and British Patent No. 1,266,829. In this case the aqueous dispersion of this invention is used in an amount of preferably about 0.1 to about 2 wt. % based on the dry weight of pulp. Because the aqueous dispersions of this invention have outstanding stability when diluted as already stated, the dispersions can be satisfactorily diluted with river water, tap water, well water or like water and are readily dispersible in aqueous slurries of pulp. The diluted dispersions remain stable for a prolonged period of time. Whereas the known aqueous dispersions referred to above require a special apparatus for dilution, the present dispersions do not necessitate such apparatus and the space needed therefor.

The aqueous dispersions of this invention are usable also for external sizing, in which case they are applied to wet sheets of paper by a usual method such as spraying, immersion or coating.

Examples are given below. Also given are reference examples for illustrating the preparation of the rosin-base materials used in the examples. In these examples, the parts and percentages are all by weight unless otherwise specified and the softening point is measured by the ring and ball method.

REFERENCE EXAMPLE 1

Tall oil rosin (1800 parts) having an acid value of 170 and a softening point of 76° C is melted by heating, and 2.7 parts of p-toluenesulfonic acid monohydrate serving as a catalyst is added to the rosin while the rosin is being stirred at 165° C. Subsequently 118 parts of 37% aqueous solution of formaldehyde is added to the mixture at 160° to 170° C over a period of 90 minutes. The mixture is stirred at the same temperature for 15 minutes, and 1.2 parts of sodium hydroxide in 12 parts of water is then added to neutralize only the catalyst. The mixture is further stirred for one hour to obtain a formaldehyde-modified rosin. To the modified rosin is added 1200 parts of gum rosin having an acid value of 175 and a softening point of 77° C, and the mixture is stirred at 175° C for 1 hour.

The resulting mixture (2950 parts) and 177 parts (6.0 wt. % based on the mixture) of fumaric acid are melted by heating and reacted at 200° C for 3 hours, giving a rosin-base material having an acid value of 208 and a softening point of 103.5° C.

REFERENCE EXAMPLE 2

Hydrogenated rosin (1800 parts) having an acid value of 166, a softening point of 70.5° C and a bromine value of 49 and 1200 parts of wood rosin having an acid value of 167 and a softening point of 75° C are melted by heating. Subsequently 120 parts of fumaric acid and 60 parts of maleic anhydride are added to the mixture heated to 170° C. The resulting mixture is reacted at the same temperature for 4 hours. The combined amount of the adducted fumaric acid and maleic anhydride is 6.0 wt. % based on the total weight of the hydrogenated rosin and wood rosin. The rosin-base material obtained has an acid value of 210 and a softening point of 98° C.

REFERENCE EXAMPLE 3

Gum rosin (1000 parts) having an acid value of 175 and a softening point of 77° C and 190 parts of fumaric acid are melted by heating and reacted at 200° C for 4 hours. The rosin adduct obtained has an acid value of 286 and a softening point of 138.5° C.

Tall oil rosin (1000 parts) having an acid value of 170 and a softening point of 76° C is melted by heating, and 2.2 parts of p-toluenesulfonic acid monohydrate is added to the rosin while the rosin is being stirred at 180° C. Subsequently 94.6 parts of 37% aqueous solution of formaldehyde is added to the mixture at 170° to 180° C over a period of 2 hours. The resulting mixture is further reacted at the same temperature for one hour, giving a modified rosin having an acid value of 164 and a softening point of 77° C.

The rosin adduct (550 parts) and 500 parts of the modified rosin obtained above are heated at 170° C and mixed together for 30 minutes, giving a rosin-base material containing about 9.1% of adducted fumaric acid based on the combined weight of the gum rosin and the modified rosin.

EXAMPLE 1

The rosin-base material (100 parts) obtained in Reference Example 1 is dissolved in 100 parts of benzene. An aqueous solution prepared by dissolving a specified amount of sodium salt of half dodecyl sulfate in 200 parts of soft water is added to the solution. The mixture is pre-dispersed in a homomixer heated at 40° C and then dispersed by being passed twice through a piston-type homogenizer ("Model 15M-8TA," product of Gaulin Corporation, U.S.A.) heated to 40° C and adjusted to an output pressure of 300 kg/cm$^2$. The benzene is distilled off from the resulting emulsion at 40° C under reduced pressure to obtain an aqueous dispersion (Dispersion E-1) of this invention. In the same manner as above except that the amount of dispersant is varried, Dispersions E-2 and E-3 are prepared. Table 1 shows the properties of the dispersions and the amounts of sodium salt of half dodecyl sulfate (listed as "SDS") used.

COMPARISON EXAMPLE 1

Aqueous dispersions are prepared in the same manner as in Example 1 except that 0.5, 1 and 2 parts of sodium dodecylbenzenesulfonate are used in place of the sodium salt of half dodecyl sulfate as the dispersant. The dispersions obtained will be referred to as "Dispersions C-1, C-2 and C-3." Table 1 shows the properties of the dispersions. Similarly an aqueous dispersion is prepared in the same manner as above except that potassium hyroxide is used in an amount required for saponifing 4% of the carboxylic groups contained in the rosin-base material. In this case, the potassium salt of rosin-base material produced i.e. rosin soap serves as the dispersant for the rosin-base material. Table 1 also indicates the properties of the dispersion (referred to as "Dispersion C-4").

COMPARISON EXAMPLE 2

The rosin-base material (100 parts) obtained in Reference Example 1, 200 parts of soft water and a specified amount of sodium salt of half dodecyl sulfate are placed into an autoclave connected to the homogenizer stated in Example 1 and pre-dispersed by being heated at 180° C for 1 hour with stirring. The pre-dispersed product is then passed through the homogenizer at the same temperature to form an aqueous dispersion, which is cooled with water-cooled condenser to obtain an aqueous dispersion (to be referred to as "Dispersion C-5"). Similarly Dispersion C-6 is prepared with the varried amounts of dispersant. Table 1 shows the properties of the dispersions.

The same procedure as above is repeated except that 2 parts of sodium dodecylbenzenesulfonate is used in place of the sodium salt of half dodecyl sulfate to prepare Dispersion C-7, the properties of which are given in Table 1.

EXAMPLE 2

The rosin-base material (100 parts) obtained in Reference Example 1 is dissolved in 100 parts of toluene. An aqueous solution prepared by dissolving 2 parts of sodium salt of half myristyl sulfate (to be listed as "SMS") in 200 parts of soft water is added to the solution. The mixture is heated to 55° C, pre-dispersed in a homomixer (5000 r.p.m.) for one minute and then fully dispersed by being passed at 55° C twice through the homogenizer used in Example 1. The toluene is distilled off from the resulting dispersion at 70° C at reduced pressure to give an aqueous dispersion of this invention (to be referred to as "Dispersion E-4"). Table 1 shows the properties of the dispersion.

EXAMPLE 3

An aqueous dispersion (Dispersion E-5) of this invention is prepared in the same manner as in Example 1 except that the rosin-base material obtained in Reference Example 2 is used and that one part of sodium salt of half dodecyl sulfate is used. The properties of the dispersion are given in Table 1.

COMPARISON EXAMPLE 3

An aqueous dispersion (Dispersion C-8) is prepared in the same manner as in Example 1 except that in place of the sodium salt of half dodecyl sulfate 15 parts of polyaminopolyamide-epichlorohydrin resin (to be listed as "AAE") was used. (The resin is polyaminopolyamide modified with epichlorohydrin and is prepared by condensing adipic acid and diethylenetriamine in the usual manner and modifying the resulting condensate with epichlorhydrin.) Table 1 shows the properties of Dispersion C-8. When 5 parts of the AAE is used, it is impossible to obtain an aqueous dispersion.

EXAMPLE 4

The rosin-base material (100 parts) obtained in Reference Example 3 is dissolved in 100 parts of toluene. An aqueous solution prepared by dissolving one part of sodium salt of half dodecyl sulfate in 200 parts of soft water is then added to the solution. Subsequently the same procedure as in Example 2 is followed to obtain an aqueous dispersion, i.e. Dispersion E-6. Table 1 shows the properties of the dispersion.

STABILITY TEST FOR DISPERSION

The 14 kinds of the aqueous dispersions obtained in the foregoing Examples are tested for mechanical stability and dilution stability.

1. Mechanical stability

A 50 g quantity of the aqueous dispersion is placed in the container of a stability tester of the Maron type (product of Shinsei Sangyo Co., Japan) and subjected to mechanical shear at a temperature of 25° C, under 10 kg load, at 1000 r.p.m. for 5 minutes. The resulting agglomerates are filtered off by a 100-mesh stainless steel screen. The mechanical stability is calculated according to the following equation.

$$\text{Mechanical stability (\%)} = \frac{\text{Dry weight of agglomerates}}{\text{Dry weight of dispersion}} \times 100$$

Table 2 shows the results.

2. Dilution stability

The aqueous dispersion is diluted with waters having hardnesses of 5°, 10° and 20° DH respectively to a concentration of 5% at 25° C. The diluted dispersion is checked with the unaided eye to measure the time taken for the formation of agglomerates. Table 2 shows the results.

Table 2

| Dispersion | Mechanical stability (%) | Dilution stability (hr) | | |
|---|---|---|---|---|
| | | 5° DH | 10° DH | 20° DH |
| E-1 | 0.32 | 16 | 10 | 4 |
| E-2 | 0.14 | 32 | 24 | 6 |
| E-3 | 0.10 | 48 | 36 | 8 |
| C-1 | 0.80 | 4 | 3 | 1 |
| C-2 | 0.52 | 10 | 4 | 2 |
| C-3 | 0.36 | 24 | 10 | 3 |
| C-4 | 0.74 | 6 | 2 | 1 |
| C-5 | 0.91 | 26 | 16 | 4 |
| C-6 | 0.30 | 36 | 24 | 6 |
| C-7 | 1.08 | 16 | 8 | 2 |
| E-4 | 0.12 | 48 | 36 | 8 |
| E-5 | 0.15 | 32 | 22 | 6 |
| C-8 | 2.0 | 8 | 4 | 1 |
| E-6 | 0.15 | 30 | 20 | 8 |

SIZING TEST

Aqueous Dispersions E-1 to E-6 obtained in the Examples are used for sizing paper. The sizing degree (sec.) of the paper obtained is measured according to the Stöckigt method (JIS P 8122).

Pulp (LBKP) having a beating degree of 30° SR is made into a 1% slurry with use of tap water (about 4.5°

Table 1

| | Dispersant | | | Properties of dispersion | | | |
|---|---|---|---|---|---|---|---|
| Dispersion | Example | Kind | Amount (Part) | Appearance | pH | Solid concn. (%) | Particle size (μ) |
| E-1 | Ex. 1 | SDS | 0.5 | Milky white | 4.2 | 35.0 | <1 |
| E-2 | " | " | 1 | " | 3.9 | 35.3 | " |
| E-3 | " | " | 2 | " | 3.8 | 34.8 | " |
| C-1 | Comp.Ex.1 | DBS | 0.5 | " | 4.3 | 34.9 | " |
| C-2 | " | " | 1 | " | 4.2 | 35.1 | " |
| C-3 | " | " | 2 | " | 4.1 | 35.0 | " |
| C-4 | " | (rosin soap) | | " | 5.8 | 35.5 | " |
| C-5 | Comp.Ex.2 | SDS | 1 | White | 4.0 | 34.0 | 1-3 |
| C-6 | " | " | 2 | " | 3.8 | 34.2 | " |
| C-7 | " | DBS | 2 | " | 4.0 | 33.9 | " |
| E-4 | Ex. 2 | SMS | 2 | Milky white | 3.8 | 35.0 | <1 |
| E-5 | Ex. 3 | SDS | 1 | " | 3.9 | 35.0 | " |
| C-8 | Comp.Ex.3 | AAE | 15 | White | 2.1 | 35.0 | 2-5 |
| E-6 | Ex. 4 | SDS | 1 | Milky white | 3.8 | 34.8 | <1 |

DH), and the chemicals are added to and uniformly dispersed in the slurry in the order (a) or (b) given below. The slurry is then made into a sheet, weighing 60 ± 1 g/m², on a TAPPI standard sheet machine. The sheet is then dried at 80° C for 5 minutes and subjected to moisture adjustment for 24 hours in an atmosphere having a constant temperature of 20° C and a constant humidity of 65% RH. The sizing effect is thereafter measured.

(a) Dispersion (0.2 or 0.5%) → alum (2.5%)

(b) Dispersion (0.2 or 0.5%) → alum (0.5%) → cationic auxiliary fixing agent (0.05%)

The amount of each chemical (dry weight) used is based on the dry weight of the pulp. The cationic auxiliary fixing agent used is polyaminopolyamideepichlorohydrin resin (trade mark: "Arafix 200" product of Arakawa Rinsan Kagaku Kogyo Kabushiki Kaisha, Japan). Table 3 shows the sizing effects (unit: second) obtained under varying conditions.

Table 3

| Order of addition of chemicals | (a) | | (b) | |
|---|---|---|---|---|
| Amount of dispersion used | 0.2 % | 0.5 % | 0.2 % | 0.5 % |
| Dispersion | | | | |
| E-1 | 25.3 | 33.0 | 28.5 | 34.7 |
| E-2 | 25.8 | 32.0 | 28.2 | 34.5 |
| E-3 | 26.2 | 33.9 | 28.9 | 35.1 |
| E-4 | 26.0 | 33.7 | 29.0 | 34.9 |
| E-5 | 25.2 | 33.1 | 28.3 | 34.5 |
| E-6 | 28.2 | 35.5 | 31.0 | 37.2 |

What we claim is:

1. A process for preparing a stable aqueous dispersion of rosin-base material by dissolving in a water-immiscible organic solvent a rosin-base material composed of 0 to 95 wt. % of rosin and 100 to 5 wt. % of an adduct of rosin and α,β-unsaturated carboxylic acid or anhydride thereof, dispersing the organic solvent solution in water in the presence of a dispersant and removing the organic solvent from the resulting emulsion, the process being characterized in that the dispersant is an alkali metal salt of a half alkyl sulfate.

2. A process as defined in claim 1 wherein the alkyl group in the alkali metal salt of half alkyl sulfate is one having 8 to 22 carbon atoms.

3. A process as defined in claim 2 wherein the alkyl group has 10 to 16 carbon atoms.

4. A process as defined in claim 2 wherein the alkali metal salt is sodium salt.

5. A process as defined in claim 4 wherein the sodium salt is sodium salt of half dodecyl sulfate or sodium salt of half myristyl sulfate.

6. A process as defined in claim 1 wherein the alkali metal salt of half alkyl sulfate is used in an amount of 0.2 to 5 wt. % based on the rosin-base material.

7. A process as defined in claim 6 wherein the alkali metal salt of half alkyl sulfate is used in an amount of 0.5 to 3 wt. % based on the rosin-base material.

8. A process as defined in claim 1 wherein the solvent is at least one member selected from the group consisting of benzene, toluene, cyclohexane and carbon tetrachloride.

9. A process as defined in claim 1 wherein the solvent solution contains about 20 to about 70 wt. % of the rosin-base material.

10. A process as defined in claim 1 wherein the organic solvent solution is dispersed in water at a temperature of 10° to 80° C.

11. A process as defined in claim 1 wherein the organic solvent solution is dispersed in water with use of a high-pressure homogenizer of the piston type.

12. A process as defined in claim 11 wherein the output pressure of the homogenizer is 100 to 600 kg/cm².

13. A process as defined in claim 1 wherein the despersion finally obtained substantially contains 1 to 60 wt. % of the rosin-base material.

14. A stable aqueous dispersion produced by the process claimed in claim 1.

* * * * *